Aug. 31, 1965       M. F. B. PICARD ETAL       3,204,182
  ADJUSTABLE SUPPORT FOR MIRROR-TYPE GALVANOMETER UNITS INCLUDING
        ADJUSTABLE MAGNETIC MEANS FOR VARYING THE SENSITIVITY
Filed May 8, 1961                            2 Sheets-Sheet 1

Maxime Felix Benoit Picard
Felix Leon Hilaire Barreteau
Jacques Fernand Moulin
                    INVENTORS
BY Richard E. Bee
                    ATTORNEY Aug. 31, 1965 M. F. B. PICARD ETAL 3,204,182
ADJUSTABLE SUPPORT FOR MIRROR-TYPE GALVANOMETER UNITS INCLUDING
ADJUSTABLE MAGNETIC MEANS FOR VARYING THE SENSITIVITY
Filed May 8, 1961 2 Sheets-Sheet 2

Maxime Felix Benoit Picard
Felix Leon Helaire Barreteau
Jacques Fernand Moulin
INVENTORS BY Richard E. Bee
ATTORNEY

United States Patent Office 3,204,182
Patented Aug. 31, 1965

3,204,182
ADJUSTABLE SUPPORT FOR MIRROR-TYPE GALVANOMETER UNITS INCLUDING ADJUSTABLE MAGNETIC MEANS FOR VARYING THE SENSITIVITY
Maxime Felix Benoit Picard, Felix Leon Hilaire Barreteau, and Jacques Fernand Moulin, all of Paris, France, assignors to Societe de Prospection Electrique, Procedes Schlumberg, Paris, France, a corporation of France
Filed May 8, 1961, Ser. No. 108,502
Claims priority, application France, May 12, 1960, 827,010, Patent 1,264,619
8 Claims. (Cl. 324—97)

This invention relates to galvanometer mounting apparatus and, particularly, to magnetic mounting blocks for mounting a plurality of individual mirror-type galvanometer units in a side-by-side manner.

Where two or more mirror-type galvanometer units are mounted side-by-side in a common magnetic mounting block, each of the individual galvanometer units is utilized to deflect a narrow beam of light onto a suitable recording medium, such as photographic film, for making thereon records of the electrical currents flowing through the individual galvanometer coils. In this manner, multiple traces or records may be made on the same recording medium. Also, the individual traces produced by the different galvanometer units may cross-over one another in any manner required by the respective electrical currents.

It is an object of the invention to provide new and improved galvanometer mounting apparatus for mounting one or more galvanometer units of the above character.

It is another object of the invention to provide new and improved galvanometer mounting apparatus which enables accurate adjustment of the physical orientation of the galvanometer unit relative to the mounting apparatus.

It is a further object of the invention to provide new and improved galvanometer mounting apparatus wherein the physical orientation of the galvanometer unit may be adjusted without upsetting the magnetic flux which is produced by the mounting apparatus and which passes through the body of the galvanometer unit.

It is an additional object of the invention to provide new and improved galvanometer mounting apparatus for passing an accurately adjustable amount of magnetic flux through the body of the galvanometer unit.

It is another object of the invention to provide new and improved galvanometer mounting apparatus for mounting a plurality of galvanometer units in a side-by-side manner and providing for individual adjustment of the different galvanometer units without appreciably increasing the bulk of the apparatus.

In accordance with the present invention, mounting apparatus for holding a galvanometer unit comprises a magnetic frame structure including magnet means for producing magnetic flux. The apparatus also includes magnetic pole piece means secured to the frame structure for completing the magnetic circuit and having a gap therein which is adapted to receive the galvanometer unit. In order to allow for adjustment of the physical orientation of the galvanometer unit in a first direction, the magnetic pole piece means includes a recessed pole piece structure and a rocker member which rests in this recess. A passageway extends through the central portion of the rocker member for receiving and holding the galvanometer unit. Means are provided for adjusting the position of the rocker member in the recess for enabling adjustment of the galvanometer orientation in the first direction. There is further associated with the rocker member suitable structure for enabling adjustment of the orientation of the galvanometer unit in a second direction. This structure includes socket and sleeve members associated with the galvanometer passageway which allow for a rotational adjustment of the galvanometer unit about its longitudinal axis.

The mounting apparatus further includes an adjustable magnetic means for adjusting the strength of the magnetic flux field applied to the galvanometer unit and, hence, the sensitivity of the galvanometer unit itself. Where a rocker member is used for an adjustment of the mechanical orientation of the galvanometer unit, this adjustable magnetic means is built into the rocker member for modifying the magnetic reluctance of a portion thereof which supplies the magnetic flux to the galvanometer unit. This adjustable magnetic means may also be used with mounting apparatus which does not employ such a rocker member.

For a better understanding of the present invention, together with other and further objects thereof, reference is had to the following description taken in connection with the accompanying drawings, the scope of the invention being pointed out in the appended claims.

Referring to the drawings.

Figure 1:
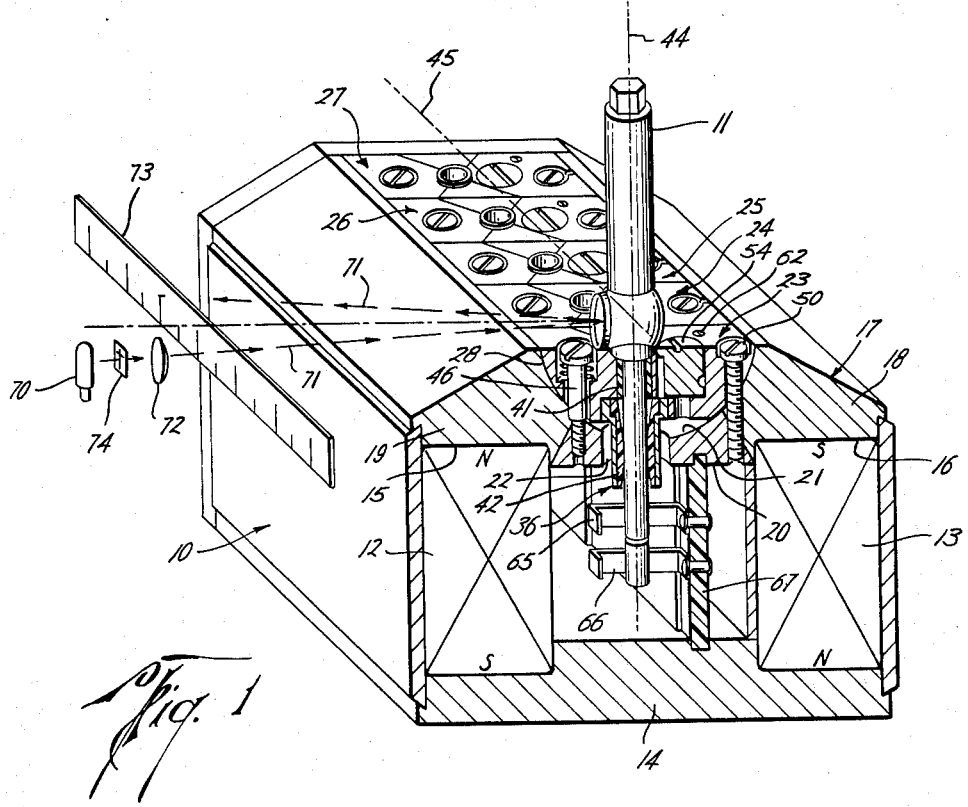
FIG. 1 is a partly sectional isometric view of a representative embodiment of galvanometer mounting apparatus constructed in accordance with the present invention.

Referring to FIG. 1 of the drawings, there is shown a galvanometer mounting apparatus 10 which is constructed in accordance with the present invention. The apparatus 10 is constructed to hold five individual galvanometer units in a side-by-side manner. For simplicity, only a single galvanometer unit 11 is shown. The portion of the mounting apparatus 10 which holds this galvanometer unit 11 is shown in a cross-sectional manner. If desired, the mounting apparatus 10 may be either extended or reduced to provide for the mounting of a greater or lesser number of galvanometer units.

The galvanometer unit 11 is of a known type wherein a movable mirror and coil assembly is suspended within the barrel thereof. Energizing the coil with electrical current causes a rotation or deflection of the mirror provided that magnetic flux is, at the same time, being passed through the portion of the galvanometer barrel containing such coil.

As seen in FIG. 1, the mounting apparatus 10 includes a magnetic frame structure including magnet means for producing magnetic flux. This magnetic frame structure includes a pair of permanent magnets 12 and 13 which extend along the length of the apparatus 10. The frame structure is completed by a yoke member 14 which also extends the length of the apparatus 10 and serves to form the base of the apparatus. This yoke member 14 is constructed of magnetic material such as iron which has a relatively high magnetic permeability. Members 12, 13 and 14 thus form a generally U-shaped frame structure with the upper poles 15 and 16 of the permanent magnets 12 and 13 constituting a pair of adjacent pole faces.

The mounting apparatus 10 further includes magnetic pole piece means 17 secured to the frame structure formed by members 12, 13 and 14 for completing the magnetic circuit and for holding the galvanometer unit 11. The pole piece means 17 is a composite structure having some portions which extend the entire length of the mounting apparatus 10 and other portions which are associated only with an individual one of the galvanometer units. In particular, the pole piece means 17 includes a pole piece structure having first and second members 18 and 19 of magnetic material such as iron which extend the entire length of the mounting apparatus 10. The magnetic members 18 and 19 are mechanically secured to one another by means of a member 20 of non-magnetic material such as brass which also extends the entire length of the mounting apparatus 10. The pole piece structure formed by these members 18, 19 and 20 is provided with a cylindrical recess 21 which runs the entire length of the mounting apparatus 10. This recess 21 is located on the upper side of the pole piece structure which faces outwardly from the frame structure formed by permanent magnets 12 and 13 and the yoke 14. A relatively large diameter cylindrical passageway 22 extends through the non-magnetic member 20 at the bottom of the recess 21 at each location along the length of the recess 21 at which it is desired to locate a galvanometer unit.

Figure 2:
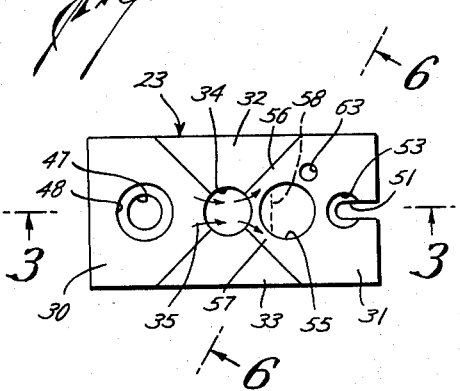
FIG. 2 is a plan view of one of the component parts of the FIG. 1 apparatus.

The composite pole piece means also includes a rocker member for each galvanometer unit, each such rocker member having a cylindrically curved surface portion which rests on the recess 21. The apparatus of FIG. 1 thus includes five such rocker members 23–27, inclusive. Only the rocker member 23 for the galvanometer unit 11 will be considered in detail, the other rocker members being of identical construction. The cylindrically-curved surface portion of the rocker member 23 is designated by reference numeral 28. A plan view of the rocker member 23 is shown in FIG. 2. As there seen, the rocker member 23 is composed of four parts 30–32 which are welded together to form a single structural unit. Parts 30 and 31 are of magnetic material such as iron having a high magnetic permeability. Parts 32 and 33, on the other hand, are composed of non-magnetic material such as brass having a magnetic permeability of substantially unity. The rocker member 23 also has a cylindrical passageway 34 which extends vertically through the central portion thereof. This passageway 34 may be better seen in FIG. 3 which is a cross-sectional view taken along the section line 3—3 of FIG. 2. As seen in FIG. 2, the magnetic portions 30 and 31 are tapered down to a dimension which is less than the diameter of the passageway 34 so that the passageway 34 forms a gap in the magnetic circuit. As a consequence, magnetic flux, indicated by arrows 35, is concentrated across the passageway 34 at the location that will be occupied by the deflection coil contained within the galvanometer unit 11.

Figure 4:
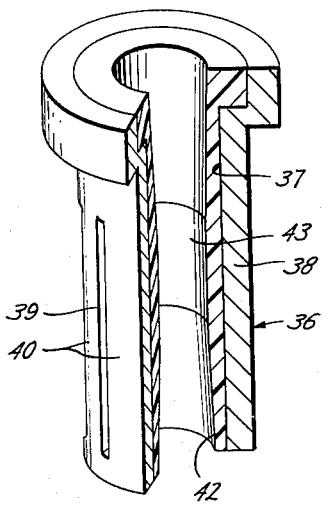
FIG. 4 is an enlarged partly sectional view of one of the component parts of the FIG. 1 apparatus.
Figure 3:
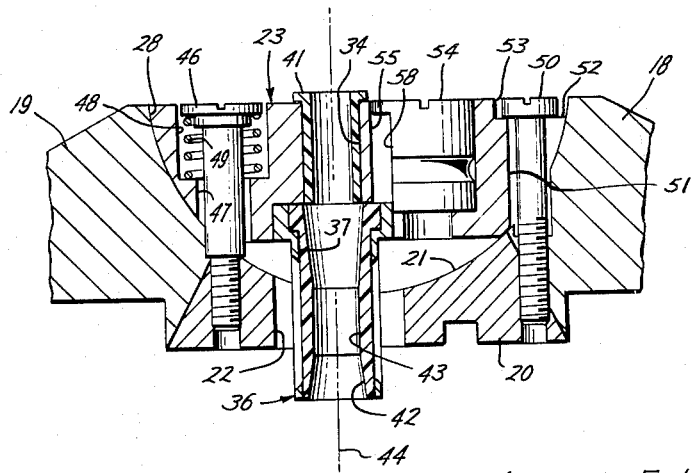
FIG. 3 is an enlarged cross-sectional view of a portion of the FIG. 1 apparatus.

The manner in which the galvanometer unit 11 is mounted and held in the rocker member 23 is best seen in the cross-sectional view of FIG. 3. As there shown, an elastic socket member 36 having a cylindrical passageway 37 is secured to the bottom of the rocker member 23 with its passageway 37 in alignment with the passageway 34 in the rocker member. An enlarged view of the elastic socket member 36 is shown in FIG. 4. This socket member 36 has an elongated generally-cylindrical and thin-walled body portion 38 composed of a relatively resilient metal. A plurality of longitudinally-extending slots 39 separate the body portion 38 into a plurality of longitudinally-extending spring-like portions 40.

Returning to FIG. 3, a pair of plastic sleeve members 41 and 42 serve to line the passageways 34 and 37 in the rocker member 23 and the socket member 36 to provide a snug fit for the lower portion of the galvanometer unit 11, which portion is inserted through these sleeve members 41 and 42 in the manner shown in FIG. 1. As seen in FIGS. 3 and 4, a raised middle section 43 of the sleeve member 42 in cooperation with the spring-like portions 40 of the socket member 36 serves to provide the principal restraining force on the barrel of the galvanometer unit 11. The plastic sleeve members 41 and 42 also serve to electrically insulate the housing of the galvanometer unit 11 from the body of the rocker member 23 and the socket member 36.

To provide for an adjustment of the orientation of the galvanometer unit 11 in a first direction, it is desired to be able to rotate the galvanometer unit 11 about its longitudinal axis 44. At the same time, it is desired that the rotational orientation of the galvanometer unit 11 should not be disturbed by external vibrations and shocks to which the apparatus may be subjected in use. Consequently, the sleeve members 41 and 42 should grip the barrel of the galvanometer unit 11 in a fairly tight manner. This, however, tends to make it difficult to obtain a smooth and accurate rotational adjustment of the galvanometer unit 11. A major difficulty where a tight fit is provided is that the large initial torque required to initiate rotation of the galvanometer unit 11 tends to produce a sudden rotation of the galvanometer unit which carries past the desired adjustment point. In order to overcome this problem, the material forming the plastic sleeve members 41 and 42 must be such that its static and dynamic coefficients of friction are very nearly the same. A preferred material which satisfies these requirements is polytetrafluoroethylene. This particular plastic material has been found to allow a smooth and accurate rotational adjustment of the galvanometer unit while still providing sufficient friction to prevent extraneous rotation due to external shocks and vibrations.

In order to provide for an adjustment of the orientation of the galvanometer unit 11 in a second direction, the rocker member 23 is provided with adjustable retaining means for maintaining the rocker member 23 in a selected position in the recess 21. As seen in FIG. 1, a sliding or rocking of the rocker member 23 relative to the recess 21 serves to tilt the galvanometer unit 11 about an axis 45 passing through the center of the mirror contained in the galvanometer unit 11. In order to provide for this rocking adjustment, the adjustable retaining means includes, as best shown in FIG. 3, a first retaining screw 46 which passes through a side passageway 47 in the rocker member 23 and is threaded into the pole piece member 20 forming the bottom of the recess 21. The diameter of the passageway 47 is appreciably greater than the diameter of the portion of retaining screw 46 which is located therein so as to allow for a shifting of the body of the rocker member 23 relative to the retaining screw 46. An upper portion 48 of the side passageway 47 is of a yet large diameter and a coil spring 49 is located in this enlarged region so as to bear against the head of the retaining screw 46. The adjustable retaining means also includes a second retaining screw 50 which passes through a side passageway 51 in the rocker member 23 and is threaded into the pole piece members 18 and 20 toward the other side of the recess 21. The diameter of the passageway 51 is substantially greater than the diameter of the portion of the retaining screw 50 located therein so as to allow for a shifting of the rocker member 23 relative to the retaining screw 50. The head of retaining screw 50 bears against a flat shoulder surface 52 forming the bottom of an enlarged portion 53 of the passageway 51. Adjustment of the retaining screw 50, together with the spring action of the coil spring 49, serves to shift the position of the rocker member 23 in the recess 21 and, hence, to tilt the galvanometer until 11 about the horizontal axis 45 which is shown in FIG. 1. In order to provide for a smooth adjustment of the rocker member 23, the surface of the recess 21 is coated with a thin layer of polytetrafluorethylene plastic material.

The rocker member 23 also includes an adjustable magnetic means for modifying the amount of magnetic flux which is passed across the galvanometer passageway 34. This adjustable magnetic means includes an adjusting slug 54 of high permeability magnetic material which is mounted in a passageway 55 located in the rocker member 23 adjacent to the galvanometer passageway 34. As seen in FIG. 2, the passageway 55 is of cylindrical cross-section and is located in the tapered portion of the magnetic member 31. Consequently, a pair of relatively-narrow web portions 56 and 57 are formed in the magnetic member 31 near the galvanometer passageway 34. In fact, the thicknesses of the web portions 56 and 57 are sufficiently small so that the magnetic material forming such web portions will be saturated with magnetic flux if the adjusting slug 54 is removed.

Figure 5:
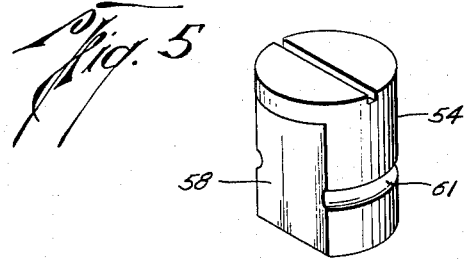
FIG. 5 is an enlarged isometric view of another of the component parts of the FIG. 1 apparatus.

An isometric view of the adjusting slug 54 is shown in FIG. 5. As there seen, this adjusting slug is provided with a flat surface 58 so as to provide a semi-cylindrical cross-section for such adjusting slug. Thus, when the adjusting slug 54 is in place in the rocker member 23, rotation of such adjusting slug 54 about its center axis serves to modify the magnetic reluctance of the rocker member magnetic portion 31. This modifies the amount of magnetic flux passing through the galvanometer passageway 34 which, in turn, modifies the deflection sensitivity of the galvanometer unit itself.

Figure 6:
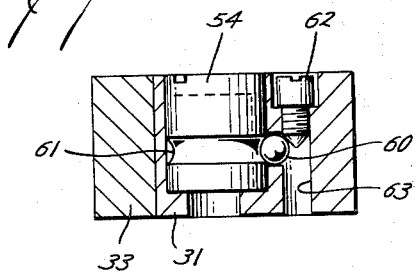
FIG. 6 is an enlarged cross-sectional view of a portion of the FIG. 1 apparatus.

Associated with the adjusting slug 54 is a suitable locking mechanism for locking this slug in a selected position. As seen in FIG. 6, which is a sectional view of a part of the rocker member 23 taken along the section line 6—6 of FIG. 2, this locking mechanism includes a spherical ball member 60 which is adapted to engage a cylindrical groove 61 in the body of the adjusting slug 54. A clamping screw 62, which is threaded into a passageway 63 in the rocker member 23, serves to press the ball 60 tightly against the surface of the groove 61 to lock the adjusting slug 54 in its selected position.

Electrical connection to the galvanometer unit 11 is provided by way of flexible contact arms 65 and 66, as shown in FIG. 1. These flexible arms are mounted on a suitable board of electrical insulation material 67.

An exemplary manner of operating the galvanometer apparatus is shown in FIG. 1. Light from an external light source represented by a lamp 70 is concentrated into a narrow beam 71 by a condensing lens 72. The light beam 71 is reflected by the mirror contained within the galvanometer unit 11 back onto, in this case, a calibrated scale 73. In most applications, the reflected light beam would also be made to impinge on a suitable recording medium, such as a photographic film, for making a permanent record of the various deflections experienced by such beam. For sake of simplicity, this latter feature is not shown in the drawings.

The calibrated scale 73 is useful for establishing the initial adjustments of the galvanometer unit prior to its usage as a measuring device. To this end, the light from the source 70 is passed through a suitable object pattern 74 before it is projected onto the mirror of the galvanometer unit 11. The resulting image reflected onto the calibrated scale 73 provides an indication of the adjustment of the galvanometer unit. The vertical height of this image is adjusted to a desired level by adjusting the position of the rocker member 23 in the recess 21. The horizontal displacement of this image along the calibrated scale 73, on the other hand, is adjusted by rotating the galvanometer unit 11 about its vertical axis 44. Lastly, the deflection sensitivity of the galvanometer unit 11 is adjusted by rotation of the magnetic adjusting slug 54. This last adjustment is made by observing the position of the image on the calibrated scale 73 when the galvanometer unit 11 is energized with electrical current of a known value.

As mentioned, the additional rocker members 24–27, which are adapted to hold additional galvanometer units similar to the galvanometer unit 11, are of identical construction to the rocker member 23. Consequently, a plurality of galvanometer units may be mounted in a side-by-side manner with provision for the independent adjustment of the orientation and sensitivity of each unit. A feature of the present invention is that this is done without unduly increasing the size or complexity of the mounting apparatus.

While there has been described what is at present considered to be a preferred embodiment of this invention, it will be obvious to those skilled in the art that various changes and modifications may be made therein without departing from the invention and it is, therefore, intended to cover all such changes and modifications as fall within the true spirit and scope of the invention.

What is claimed is:

1. Mounting apparatus for holding an elongated cylindrical barrel-type mirror galvanometer unit comprising: a magnetic frame structure including magnet means for producing magnetic flux; and magnetic pole piece means secured to the frame structure for completing the magnetic circuit and having a cylindrical passageway therethrough which forms a gap in the magnetic circuit and which is adapted to receive the galvanometer unit, this pole piece means including an adjustable magnetic means located in the magnetic circuit adjacent to and in series magnetic circuit relationship with the galvanometer gap for modifying the magnetic reluctance of such pole piece means thereby to provide for an adjustment of the sensitivity of the galvanometer unit.

2. Mounting apparatus for holding an elongated cylindrical barrel-type mirror galvanometer unit comprising: a magnetic frame structure including magnet means for producing magnetic flux; magnetic pole piece means secured to the frame structure for completing the magnetic circuit and having a first cylindrical passageway therethrough which forms a gap in the magnetic circuit and which is adapted to receive the galvanometer unit and second cylindrical passageway located in the magnetic circuit adjacent to and in series magnetic circuit relationship with the galvanometer passageway; and an adjusting slug of magnetic material mounted in the second passageway and adapted for rotational movement therein for modifying the magnetic reluctance of such pole piece means thereby to provide for an adjustment of the sensitivity of the galvanometer unit.

3. Mounting apparatus for holding an elongated cylindrical barrel-type mirror galvanometer unit comprising: a magnetic frame structure including magnet means for producing magnetic flux; magnetic pole piece means secured to the frame structure for completing the magnetic circuit and having a first cylindrical passageway therethrough which is adapted to receive the galvanometer unit, the magnetic portions of this pole piece means on opposing sides of the galvanometer passageway being tapered down to direct the magnetic flux across such passageway, one of these tapered magnetic portions having a second cylindrical passageway therein which runs parallel to and is in series magnetic circuit relationship with the galvanometer passageway; and an adjusting slug of magnetic material of semi-cylindrical cross section located in the second cylindrical passageway and adapted for rotation therein for modifying the magnetic reluctance of the pole piece means thereby to provide for an adjustment of the sensitivity of the galvanometer unit.

4. Mounting apparatus for holding an elongated mirror-type galvanometer unit comprising: a magnetic frame structure having a pair of adjacent pole faces and including magnet means for producing magnetic flux; a pole piece structure secured between the pole faces of the frame structure and having a recess of cylindrical curvature in a side thereof facing outwardly from the frame structure, a passageway between the bottom of the recess and the opposite side of the pole piece structure, and first and second magnetic portions for extending the magnetic circuit to opposite sides of the recess; a rocker member having a cylindrically-curved surface portion which rests in the recess, a passageway which extends through the rocker member to the surface portion thereof nearest the bottom of the recess for receiving and holding the galvanometer unit, and a pair of magnetic portions which cooperate with the magnetic portions of the pole piece structure to pass magnetic flux across the rocker member passageway; an adjustable member of magnetic material forming part of one of the magnetic portions of the rocker member and adapted for adjustment for modifying the magnetic reluctance of the rocker member for providing an adjustment of the sensitivity of the galvanometer unit; and adjustable retaining means for maintaining the rocker member in a selected position in the recess, adjustment of this retaining means serving to adjust the undeflected orientation of the mirror contained in the galvanometer unit.

5. Mounting apparatus for holding an elongated mirror-type galvanometer unit comprising: a magnetic frame structure having a pair of adjacent pole faces and including magnet means for producing magnetic flux; a pole piece structure secured between the pole faces of the frame structure and having a cylindrical recess in a side thereof facing outwardly from the frame structure, a passageway between the bottom of the recess and the opposite side of the pole piece structure, and first and second magnetic portions for extending the magnetic circuit to opposite sides of the recess; a rocker member having a cylindrically-curved surface portion which rests in the recess, a passageway which extends through the rocker member to the surface portion thereof nearest the bottom of the recess for receiving and holding the galvanometer unit, a pair of magnetic portions which cooperate with the magnetic portions of the pole piece structure to pass magnetic flux across the galvanometer passageway, a second passageway located in one of the pair of magnetic portions and adjacent to the galvanometer passageway, and a pair of side passageways extending through the rocker member parallel to the galvanometer passageway and located on opposite sides thereof near the lips of the cylindrical recess, one of these side passageways having a portion of enlarged diameter at the upper end thereof; an adjusting slug of magnetic material mounted in the second passageway and adapted for movement therein for modifying the magnetic reluctance of the rocker member for providing an adjustment of the sensitivity of the galvanometer unit; a pair of retaining screws threaded into the pole piece structure and individually extending through different ones of the side passageways, the diameters of these screws being less than the diameters of the side passageways; and a coil spring located in the enlarged diameter portion of the side passageway having same for maintaining the rocker member against the head of the retaining screw in the other side passageway.

6. Mounting apparatus for holding an elongated cylindrical barrel-type mirror galvanometer unit comprising: a magnetic frame structure including magnet means for producing magnetic flux; magnetic pole piece means secured to the frame structure for completing the magnetic circuit and having a cylindrical passageway therethrough which forms a gap in the magnetic circuit and which is adapted to receive and hold the galvanometer unit; an elongated elastic metal socket member having a cylindrical passageway extending longitudinally therethrough formed by a plurality of longitudinally extending elongated resilient metal side portions, this socket member being secured to the magnetic pole piece means with its passageway in alignment with the passageway in the pole piece means; and plastic sleeve members lining the passageways of both the pole piece means and the elastic socket member for providing a snug fit for the galvanometer unit and for electrically insulating same from the pole piece means, these sleeve members being composed of a plastic material which allows for a smooth rotation of the galvanometer unit when mounted in the passageways thereby to enable an accurate adjustment of the undeflected orientation of the mirror contained in the galvanometer unit.

7. Mounting apparatus for holding an elongated cylindrical barrel-type mirror galvanometer unit comprising: a magnetic frame structure including magnet means for producing magnetic flux; magnetic pole piece means secured to the frame structure for completing the magnetic circuit and having a cylindrical passageway therethrough which forms a gap in the magnetic circuit and which is adapted to receive and hold the galvanometer unit; an elongated elastic metal socket member having a cylindrical passageway extending longitudinally therethrough formed by a plurality of longitudinally extending elongated resilient metal side portions, this socket member being secured to the magnetic pole piece means with its passageway in alignment with the passageway in the pole piece means; and plastic sleeve members lining the passageways of both the pole piece means and the elastic socket member for providing a snug fit for the galvanometer unit and for electrically insulating same from the pole piece means, these sleeve members being composed of a plastic material which allows for a smooth rotation of the galvanometer unit when mounted in the passageways thereby to enable an accurate adjustment of the undeflected orientation of the mirror contained in the galvanometer unit, the sleeve member lining the socket member passageway having a mid-section of increased thickness for cooperating with the resilient metal portions of the socket member to apply a spring-like restraining force against the barrel of the galvanometer unit.

8. Mounting apparatus for holding an elongated cylindrical barrel-type mirror galvanometer unit comprising: a magnetic frame structure including magnet means for producing magnetic flux; magnetic pole piece means secured to the frame structure for completing the magnetic circuit and having a cylindrical passageway therethrough which forms a gap in the magnetic circuit and which is adapted to receive and hold the galvanometer unit; an elongated elastic metal socket member having a cylindrical passageway extending longitudinally therethrough formed by a plurality of longitudinally extending elongated resilient metal side portions, this socket member being secured to the magnetic pole piece means with its passageway in alignment with the passageway in the pole piece means; and plastic sleeve members lining the passageways of both the pole piece means and the elastic socket member for providing a snug fit for the galvanometer unit and for electrically insulating same from the pole piece means, these sleeve members being composed of polytetrafluoroethylene for enabling an accurate rotational adjustment of the galvanometer unit.

References Cited by the Examiner

UNITED STATES PATENTS

| 2,149,442 | 3/39 | Kannenstine | 324—97 |
| 2,179,305 | 11/39 | Stickney | 324—151 |
| 2,425,407 | 8/47 | Washburn | 324—97 |
| 2,516,740 | 7/50 | Young | 324—151 |
| 2,854,607 | 9/58 | Niklas | 324—151 |
| 2,873,429 | 2/59 | Atchley | 324—97 |
| 2,892,154 | 6/59 | Johnson | 324—154 |
| 2,908,866 | 10/59 | Heiland | 324—97 |
| 2,973,997 | 3/61 | Kirkland | 174—52 |

WALTER L. CARLSON, *Primary Examiner.*

BENNETT G. MILLER, *Examiner.*